United States Patent
Knebel

(10) Patent No.: US 12,534,607 B2
(45) Date of Patent: Jan. 27, 2026

(54) THERMOPLASTIC COMPOSITION HAVING IMPROVED MECHANICAL PROPERTIES

(71) Applicant: SIKA TECHNOLOGY AG, Baar (CH)

(72) Inventor: Oliver Knebel, Lucerne (CH)

(73) Assignee: SIKA TECHNOLOGY AG, Baar (CH)

( * ) Notice: Subject to any disclaimer, the term of this patent is extended or adjusted under 35 U.S.C. 154(b) by 138 days.

(21) Appl. No.: 18/014,439

(22) PCT Filed: Sep. 29, 2021

(86) PCT No.: PCT/EP2021/076763
§ 371 (c)(1),
(2) Date: Jan. 4, 2023

(87) PCT Pub. No.: WO2022/069527
PCT Pub. Date: Apr. 7, 2022

(65) Prior Publication Data
US 2023/0250267 A1 Aug. 10, 2023

(30) Foreign Application Priority Data
Sep. 29, 2020 (EP) .................................... 20199022

(51) Int. Cl.
*C08L 23/16* (2006.01)

(52) U.S. Cl.
CPC ......... *C08L 23/16* (2013.01); *C08L 2205/025* (2013.01); *C08L 2205/03* (2013.01); *C08L 2205/035* (2013.01); *C08L 2205/22* (2013.01); *C08L 2207/04* (2013.01)

(58) Field of Classification Search
CPC ............... C08L 23/16; C08L 2205/025; C08L 2205/03; C08L 2205/035; C08L 2205/22; C08L 2207/04
See application file for complete search history.

(56) References Cited

U.S. PATENT DOCUMENTS

| | | | |
|---|---|---|---|
| 7,294,675 B2 | 11/2007 | Hoyweghen et al. | |
| 2006/0100377 A1* | 5/2006 | Ouhadi | C08L 23/16 525/240 |
| 2007/0190279 A1* | 8/2007 | Mussig | C08L 23/10 428/40.1 |
| 2007/0208139 A1* | 9/2007 | Raulie | C08L 23/10 525/240 |

FOREIGN PATENT DOCUMENTS

| | | | | |
|---|---|---|---|---|
| EP | 1655331 A1 * | 5/2006 | ............. | C08L 23/16 |
| KR | 20190093215 A * | 8/2019 | ............... | B32B 5/18 |

OTHER PUBLICATIONS

Product Data Sheet, downloaded on Jun. 4, 2025.*
Dec. 23, 2021 International Search Report issued in International Patent Application No. PCT/EP2021/076763.
Dec. 23, 2021 Written Opinion issued in International Patent Application No. PCT/EP2021/076763.

* cited by examiner

Primary Examiner — Kumar R Bhushan
(74) Attorney, Agent, or Firm — Oliff PLC

(57) ABSTRACT

A thermoplastic composition includes at least one thermoplastic vulcanizate, at least one thermoplastic polyolefin elastomer, and at least one propylene copolymer, wherein the at least one thermoplastic polyolefin elastomer has a flexural modulus at 23° C. of not more than 750 MPa and wherein the at least one propylene copolymer is a propylene-ethylene copolymer. A sealing device includes a waterproofing layer obtained by using the thermoplastic composition, a method for producing a sealing device, and a method for waterproofing a substrate.

17 Claims, No Drawings

THERMOPLASTIC COMPOSITION HAVING IMPROVED MECHANICAL PROPERTIES

TECHNICAL FIELD

The invention relates to thermoplastic compositions comprising a thermoplastic vulcanizate and thermoplastic elastomers. The invention also relates to a sealing device, such as a roofing membrane, obtained by using such thermoplastic compositions, and to a method for waterproofing a substrate.

BACKGROUND OF THE INVENTION

In the field of construction polymeric sheets, which are often referred to as membranes or panels, are used to protect underground and above ground constructions, such as basements, tunnels, or roofs against penetration of water. Waterproofing membranes are applied, for example, to prevent ingress of water through cracks that develop in the concrete structure due to building settlement, load deflection or concrete shrinkage. Roofing membranes are commonly used for waterproofing of flat and low-sloped roof structures.

The membranes are typically delivered to a construction site in form of rolls, transferred to the place of installation, unrolled, and adhered to the substrate to be waterproofed. Waterproofing membranes are also used in form of tapes for sealing and waterproofing of construction gaps in building facades, for example gaps between a building structure and window or curtain wall components.

The substrate on which the membrane or tape is adhered may be comprised of variety of materials depending on the installation site. The substrate may, for example, be a concrete, fiber concrete, metal, or a plywood substrate, or it may include an insulation board or recover board and/or an existing membrane.

Commonly used materials for roofing and waterproofing membranes and tapes include plastics, especially thermoplastics such as plasticized polyvinylchloride (p-PVC), thermoplastic polyolefin elastomers (TPO, TPE-O), and elastomers such as ethylene-propylene diene monomer (EPDM) rubber. Thermoplastic polyolefin elastomers are heterophasic polymer systems comprising a high crystallinity base polyolefin and a low-crystallinity or amorphous polyolefin modifier. Waterproofing membranes based on crosslinked EPDM are very flexible and resistant to weathering but joints formed between overlapped portions of adjacent membranes cannot be sealed by heat-welding due to the chemically crosslinked polymer structure. Membranes composed of TPO materials are heat-weldable and less expensive than EPDM-membranes, but they are also more rigid, which is can be a disadvantage in some applications. Membranes based on plasticized PVC are more flexible than membranes based on TPO materials, but they also contain environmentally harmful plasticizers and heavy metal additives such as flame retardants that may restrict their use in some applications.

The inferior flexibility of TPO-based membranes compared to plasticized PVC-based membranes is a well-known problem and various approaches have been taken to provide a TPO material with increased flexibility. One approach is based on increasing the proportion of the elastomer component in a TPO-material to obtain a membrane with reduced flexural modulus. However, increasing the proportion of the elastomer component, such as EP rubber or EPDM rubber over 20 wt.-%, increases the tackiness of the TPO-material and results in an adverse effect known as blocking, which can be characterized as increased adhesion between adjacent layers, which have been pressed together. The blocking of the membrane complicates various post-processing steps such as cutting, welding, stacking, and unwinding from a roll. Organic and inorganic anti-blocking agents are typically used to decrease the blocking of thin polyolefin films. The tackiness can also be reduced by crosslinking at least a portion of the elastomer component present in the TPO-material. Such modified TPOs can be obtained by melt-blending a statically or dynamically crosslinked elastomer component with a thermoplastic component. TPOs containing a dynamically vulcanized (crosslinked) elastomer component are also known as thermoplastic vulcanizates (TPV, TPE-v).

Roofing membranes must be securely fastened to the roof substrate to provide sufficient mechanical strength to resist the shearing forces applied on it due to high wind loads. Roof systems are typically divided into two categories depending on the means used for fastening the roofing membrane to the roof substrate. In a mechanically attached roof system, the roofing membrane is fastened to the roof substrate by using screws and/or barbed plates. Mechanical fastening enables high strength bonding, but it provides direct attachment to the roof substrate only at locations where a mechanical fastener affixes the membrane to the surface, which makes mechanically attached membranes susceptible to flutter. In fully adhered roof systems, the membrane is typically adhered to the roof substrate indirectly by using an adhesive composition.

Furthermore, adjoining membranes are typically overlapped along the length of the membrane at the selvage edge in order to create a continuous waterproofing seal on the surface of the substrate to be waterproofed. The opposing surfaces of the overlapping portions are then bonded to each other by using an adhesive ("bonded seams") or by heat-welding ("welded seams"). The choice between bonded and welded seams depends on the composition of the membranes. TPO-membranes are non-crosslinked and, therefore, the overlapping portions can be bonded to each other by heat-welding. On the other hand, the joints between adjacent crosslinked EPDM-membranes must be sealed by adhesive bonding or by using sealing tapes.

There thus remains a need for a novel type of TPO-based roofing membrane, which can be produced at lower costs compared to the State-of-the-Art membranes and which enables forming waterproofing coverings, in which all seams formed between overlapping edges of adjacent membranes can be sealed by heat-welding.

SUMMARY OF THE INVENTION

The object of the present invention is to provide a thermoplastic composition suitable for providing sealing devices, which can be used for sealing of underground and above ground constructions against penetration of water and wherein seams formed between overlapping edges of adjacent membranes can be sealed by heat-welding.

The subject of the present invention is a thermoplastic composition as defined in claim 1.

It was surprisingly found out that a thermoplastic composition comprising at least one thermoplastic vulcanizate, at least one thermoplastic polyolefin elastomer, and at least one propylene copolymer can solve or at least mitigate the problems of the State-of-the-Art polyolefin compositions used for providing waterproofing membrane sheets.

It was also surprisingly found out that the thermoplastic composition exhibits surprisingly low tackiness, which enables storing of sealing device sheets in form of rolls even at elevated temperatures without blocking of the surfaces of the membrane sheets.

One of the advantages of the thermoplastic composition of the present invention is that the sealing device sheets obtained by using the thermoplastic composition show an improved flexibility compared to State of the Art TPO-based membranes, which enable their use in in various waterproofing applications including waterproofing of roof substrates.

Another advantage of the thermoplastic composition of the present invention is that the membrane sheets can be produced from the thermoplastic composition using a single-step production process without a post-crosslinking step. Consequently, the membrane sheets can be produced with lower costs compared, for example, to the crosslinked EPDM-membranes. Furthermore, the membrane sheets are also essentially free of crosslinking chemicals and catalysts.

Other subjects of the present invention are presented in other independent claims. Preferred aspects of the invention are presented in the dependent claims.

DETAILED DESCRIPTION OF THE INVENTION

The subject of the present invention is a thermoplastic composition comprising:
a) At least one thermoplastic vulcanizate TPV,
b) At least one thermoplastic polyolefin elastomer TPO, and
c) At least one propylene copolymer PCP, wherein
the at least one thermoplastic polyolefin elastomer TPO has a flexural modulus at 23° C. determined according to ISO 178:2019 standard of not more than 750 MPa, preferably not more than 500 MPa and wherein the at least one propylene copolymer PCP is a propylene-ethylene copolymer, preferably a random propylene-ethylene copolymer.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "molecular weight" designates the molar mass (g/mol) of a molecule or a part of a molecule, also referred to as "moiety". The term "average molecular weight" refers to number average molecular weight (Mn) of an oligomeric or polymeric mixture of molecules or moieties. The molecular weight may be determined by conventional methods, preferably by gel permeation-chromatography (GPC) using polystyrene as standard, styrene-divinylbenzene gel with porosity of 100 Angstrom, 1000 Angstrom and 10000 Angstrom as the column and, depending on the molecule, tetrahydrofurane as a solvent, at 35° C., or 1,2,4-trichlorobenzene as a solvent, at 160° C.

The term "melting temperature ($T_m$)" refers to a melting point determined as a maximum of the curve determined by means of differential scanning calorimetry (DSC) using the measurement method as defined in ISO 11357-3:2018 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

"Comonomer content of a copolymer" refers to the total amount of comonomers in the copolymer given in wt.-% or mol-%. The comonomer content can be determined by IR spectroscopy or by quantitative nuclear-magnetic resonance (NMR) measurements.

The term "thermoplastic polymer" refers in the present disclosure to polymers which can be melted and re-solidified with little or no change in physical properties.

The term "elastomer" designates a polymer or a polymer blend, which is capable of recovering from large deformations, and which can be, or already is, modified to a state in which it is essentially insoluble (but can swell) in a boiling solvent, in particular xylene. Typical elastomers are capable of being elongated or deformed to at least 200% of their original dimension under an externally applied force, and will substantially resume the original dimensions, sustaining only small permanent set (typically no more than about 20%), after the external force is released. As used herein, the term "elastomer" may be used interchangeably with the term "rubber."

The term "crosslinked" refers to a polymer matrix, in which the polymer chains are inter-connected by a plurality of covalent bonds that are stable mechanically and thermally. Other possible forms of crosslinked polymers such as physically crosslinked polymers are not regarded as "crosslinked" in the context of the present disclosure. The terms "cured" and "vulcanized" may be used interchangeably with the term "crosslinked".

The term "crosslinking degree" refers to a proportion of the component, which is insoluble in boiling xylene. The percentage of insoluble proportion can be determined by refluxing a test specimen in boiling xylene, weighting the dried residue and making suitable corrections for other soluble and insoluble components present in the tested composition. Preferably, the crosslinking degree is measured by using a method as defined in ISO 10147:2011 standard.

The "amount or content of at least one component X" in a composition, for example "the amount of the at least one thermoplastic polymer P" refers to the sum of the individual amounts of all thermoplastic polymers P contained in the composition. Furthermore, in case the composition comprises 20 wt.-% of at least one thermoplastic polymer P, the sum of the amounts of all thermoplastic polymers P contained in the composition equals 20 wt.-%.

The term "roam temperature" designates a temperature of 23° C.

The thermoplastic composition of the present invention comprises at least one thermoplastic vulcanizate TPV.

The term "thermoplastic vulcanizate" refers in the present disclosure to a composition comprising a at least partially vulcanized rubber component dispersed into a plastic component. Thermoplastic vulcanizates can be prepared by a dynamic vulcanization process in which a rubber component is selectively vulcanized during mixing of a blend comprising the rubber component and the plastic component while minimally affecting the plastic component. Vulcanization of the rubber component is typically not initiated before a well-mixed polymer blend is formed and the mixing is continued during the vulcanization step. State-of-the-Art commercially available TPVs typically comprise a thermoplastic matrix that is filled with micrometer size partially or fully crosslinked rubber particles. Processing oils are also used for improving the melt-processing properties of TPV compositions. Examples of TPVs and production processes therefor are disclosed, for example, in U.S. Pat. No. 7,294,675 B2.

Suitable thermoplastic vulcanizates to be used as the at least one thermoplastic vulcanizate TPV are commercially available, for example, under the trade name of Milastomer® (from Mitsui Chemicals) and under the trade name of Santoprene® (from Exxon Mobil).

Preferably, the at least one thermoplastic vulcanizate TPV comprises not more than 50 wt.-%, more preferably not more than 35 wt.-%, even more preferably not more than 30 wt.-%, of the total weight of the thermoplastic composition. According to one or more embodiments, the at least one thermoplastic vulcanizate TPV comprises 1-50 wt.-%, preferably 2.5-40 wt.-%, more preferably 5-35 wt.-%, even more preferably 10-30 wt.-%, still more preferably 10-25 wt.-%, most preferably 15-25 wt.-%, of the total weight of the thermoplastic composition.

Preferably, the at least one thermoplastic vulcanizate TPV comprises a blend of a thermoplastic resin and particles of a at least partially vulcanized rubber dispersed throughout a matrix of the thermoplastic resin. The term "matrix" refers here to a continuous phase of the thermoplastic resin.

Suitable rubbers for use in the blend of the at least one thermoplastic vulcanizate TPV include, for example, butyl rubber, halogenated butyl rubber, ethylene-propylene diene rubber, natural rubber, chloroprene rubber, synthetic 1,4-cis-polyisoprene, polybutadiene, ethylene-propylene rubber, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer.

According to one or more embodiments, the rubber is selected from the group consisting of butyl rubber, halogenated butyl rubber, ethylene-propylene diene rubber, natural rubber, synthetic 1,4-cis-polyisoprene, polybutadiene, and ethylene-propylene rubber.

The term "butyl rubber" designates in the present disclosure a polymer derived from a monomer mixture containing a major portion of a $C_4$ to $C_7$ monoolefin monomer, preferably an isoolefin monomer and a minor portion, such as not more than 30 wt.-%, of a $C_4$ to $C_{14}$ multiolefin monomer, preferably a conjugated diolefin. The preferred $C_4$ to $C_7$ monoolefin monomer is preferably selected from the group consisting of isobutylene, 2-methyl-1-butene, 3-methyl-1-butene, 2-methyl-2-butene, 4-methyl-1-pentene, and mixtures thereof.

The term "ethylene propylene diene rubber" refers in the present disclosure to terpolymer of ethylene, propylene and a non-conjugated diene. Non-limiting examples of suitable non-conjugated dienes to be used in an ethylene propylene diene rubber include, for example, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,4-cyclohexadiene; tetrahydroindene; methyltetrahydroindene; dicyclopentadiene; 5-isopropylidene-2-norbornene; and 5-vinyl-norbornene.

Suitable thermoplastic resins for use in the blend of the at least one thermoplastic vulcanizate TPV include, for example, polyolefins, such as polyethylene, ethylene copolymers, polypropylene and propylene copolymers. According to one or more embodiments, the thermoplastic resin comprises a propylene copolymer, preferably a random propylene copolymer, preferably having a melting temperature determined by DSC according to 11357-3:2018 standard using a heating rate of 2° C./min of not more than 135° C., more preferably not more than 115° C., even more preferably not more than 105° C.

According to one or more embodiments, the blend of the at least one thermoplastic vulcanizate TPV comprises 15-75 parts by weight of the thermoplastic resin and 25-85 parts by weight of the at least partially vulcanized rubber per 100 parts total weight of the thermoplastic resin and the at least partially vulcanized rubber.

According to one or more embodiments, the blend of the at least one thermoplastic vulcanizate TPV further comprises 10-300 parts by weight, preferably 50-250 parts by weight, of an additive oil per 100 parts by weight of the at least partially vulcanized rubber.

Preferred additive oils for use in the blend include process oils, such as mineral oils, synthetic oils, and vegetable oils, and liquid polyolefin resins as well as organic esters and synthetic plasticizers.

The term "mineral oil" refers in the present disclosure hydrocarbon liquids of lubricating viscosity (i.e., a kinematic viscosity at 100° C. of 1 cSt or more) derived from petroleum crude oil and subjected to one or more refining and/or hydroprocessing steps, such as fractionation, hydrocracking, dewaxing, isomerization, and hydrofinishing, to purify and chemically modify the components to achieve a final set of properties. In other words, the term "mineral" refers in the present disclosure to refined mineral oils, which can be also characterized as Group 1-111 base oils according the classification of the American Petroleum Institute (API).

Suitable mineral oils to be used as the additive oil include paraffinic, naphthenic, and aromatic mineral oils. Particularly suitable mineral oils include paraffinic and naphtenic oils containing relatively low amounts of aromatic moieties, such as not more than 25 wt.-%, preferably not more than 15 wt.-%, based on the total weight of the mineral oil.

The term "synthetic oil" refers in the present disclosure to full synthetic (polyalphaolefin) oils, which are also known as Group IV base oils according to the classification of the American Petroleum Institute (API). Suitable synthetic oils are produced from liquid polyalphaolefins (PAOs) obtained by polymerizing α-olefins in the presence of a polymerization catalyst, such as a Friedel-Crafts catalyst. In general, liquid PAOs are high purity hydrocarbons with a paraffinic structure and high degree of side-chain branching. Particularly suitable synthetic oils include those obtained from so-called Gas-To-Liquids processes.

Suitable liquid polyolefin resins to be used as the additive oil include liquid polybutene and liquid polyisobutylene (PIB). The term "liquid polybutene" refers in the present document to at 25° C. liquid low molecular weight olefin oligomers comprising isobutylene and/or 1-butene and/or 2-butene. The ratio of the C4-olefin isomers can vary by manufacturer and by grade. When the C4-olefin is exclusively 1-butene, the material is referred to as "poly-n-butene" or "PNB". The term "liquid polyisobutylene" refers in the present document to low molecular weight polyolefins and olefin oligomers of isobutylene. Particularly suitable liquid polybutenes and liquid polyisobutylenes have a number average molecular weight (Mn) of less than 15000 g/mol, preferably less than 5000 g/mol, more preferably less than 3500 g/mol.

According to one or more embodiments, the at least partially vulcanized rubber has a crosslinking degree determined by using the method as defined in ISO 10147:2011 standard of at least 50 wt.-%, preferably at least 75 wt.-%, more preferably at least 80 wt.-%, even more preferably at least 90 wt.-%.

The thermoplastic composition of the present invention further comprises at least one thermoplastic polyolefin elastomer TPO. It goes without saying that the at least one thermoplastic polyolefin elastomer TPO is different from the at least one thermoplastic vulcanizate TPV and from the at least one propylene copolymer PCP.

The term "thermoplastic polyolefin elastomer (TPO, TPE-O)" refers to specific type of thermoplastic elastomers (TPE), which are provided as physical or reactor blends of olefinic constituents. TPOs are heterophasic polymer systems comprising a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Commercially available TPOs include reactor blends of the base polyolefin and the polyolefin modifier, also known as "in-situ TPOs" or "reactor TPOs or "impact copolymers (ICP)", as well as physical blends of the aforementioned components. In case of a reactor-blend type of TPO, the components are typically produced in a sequential polymerization process, wherein the components of the matrix phase are produced in a first reactor and transferred to a second reactor, where the components of the dispersed phase are produced and incorporated as domains in the matrix phase. A physical-blend type of TPO is produced by melt-mixing the base polyolefin with the polyolefin modifier each of which was separately formed prior to blending of the components.

Reactor-blend type TPOs comprising polypropylene homopolymer as the base polymer are often referred to as "heterophasic propylene copolymers (HECO)" whereas reactor-blend type TPOs comprising propylene random copolymer as the base polymer are often referred to as "heterophasic propylene random copolymers (RAHECO)". The term "heterophasic propylene copolymer" encompasses in the present disclosure both the HECO and RAHECO types of heterophasic propylene copolymers.

Depending on the amount of the polyolefin modifier, the commercially available heterophasic propylene copolymers are typically characterized as "impact copolymers" (ICP) or as "reactor-TPOs" or as "soft-TPOs". The main difference between these types of TPOs is that the amount of the polyolefin modifier is typically lower in ICPs than in reactor-TPOs and soft-TPOs, such as not more than 40 wt.-%, particularly not more than 35 wt.-%. Consequently, typical ICPs tend to have a lower xylene cold soluble (XCS) content determined according to ISO 16152:2005 standard as well as higher flexural modulus determined according to ISO 178:2019 standard compared to reactor-TPOs and soft-TPOs.

According to one or more embodiments, the at least one thermoplastic polyolefin elastomer TPO comprises 1-30 wt.-%, preferably 1.5-25 wt.-%, more preferably 2.5-25 wt.-%, even more preferably 5-20 wt.-%, still more preferably 7.5-15 wt.-%, of the total weight of the thermoplastic composition.

According to one or more embodiments, the at least one thermoplastic polyolefin elastomer TPO has:
  a flexural modulus at 23° C. determined according to ISO 178:2019 standard of not more than 450 MPa, preferably not more than 350 MPa, more preferably not more than 250 MPa, even more preferably not more than 200 MPa, still more preferably not more than 150 MPa, most preferably not more than 100 MPa and/or
  a melting temperature determined by DSC according to ISO 11357-3:2018 standard using a heating rate of 2° C./min of at least 100° C., preferably at least 110° C., more preferably at least 120° C., even more preferably at least 130° C., still more preferably at least 135° C. and/or
  a melt flow rate (230° C./2.16 kg) determined according to ISO 1133 standard of not more than 100 g/10 min, preferably not more than 75 g/10 min, more preferably not more than 50 g/10 min, even more preferably not more than 35 g/10 min and/or
  a xylene cold soluble content determined according to ISO 16152:2005 standard of at least 10 wt.-%, preferably at least 25 wt.-%, more preferably at least 35 wt.-%, even more preferably at least 45 wt.-%, still more preferably at least 55 wt.-%, such as in the range of 15-95 wt.-%, preferably 25-90 wt.-%, more preferably 35-85 wt.-%, even more preferably 45-80 wt.-%, still more preferably 50-70 wt.-%.

According to one or more embodiments, the at least one thermoplastic polyolefin elastomer TPO is a heterophasic propylene copolymer, preferably comprising:
  A) at least one polypropylene having a melting temperature ($T_m$) of 100° C. or more, preferably a propylene homopolymer and/or a random copolymer of propylene having a comonomer content of less than 10 wt.-%, preferably less than 5 wt.-%, based on the weight of the copolymer and
  B) at least one polyolefin having a glass transition temperature ($T_g$) of −20° C. or less, preferably an ethylene copolymer having a comonomer content of at least 5 wt.-%, preferably at least 10 wt.-%, based on the weight of the copolymer, preferably having a glass transition temperature ($T_g$) of −25° C. or less, more preferably −35° C. or less, preferably an ethylene-propylene rubber (EPR),
wherein the heterophasic propylene copolymer comprises a matrix phase composed primarily of A) and a dispersed phase composed primarily of B).

According to one or more embodiments, the heterophasic propylene copolymer is a reactor blend of A) and B), wherein the reactor blend has preferably been obtained by using a sequential polymerization process, wherein constituents of the matrix phase are produced in a first reactor and transferred to a second reactor where constituents of the dispersed phase are produced and incorporated as domains into the matrix phase.

Particularly suitable heterophasic propylene copolymers for use as the at least one thermoplastic polyolefin elastomer TPO include, for example, "reactor TPOs" and "soft TPOs" produced with LyondellBasell's Catalloy process technology, which are available under the trade names of Adflex®, Adsyl®, Clyrell®, Hifax®, Hiflex®, and Softell®, such as Hifax® CA 10A, Hifax® CA 12A, and Hifax® CA 60 A, and Hifax® CA 212 A. Further suitable heterophasic propylene copolymers are commercially available under the trade name of Borsoft® (from *Borealis* Polymers), such as Borsoft® SD233 CF.

The thermoplastic composition of the present invention further comprises at least one propylene copolymer PCP. It goes without saying that the at least one propylene copolymer PCP is different from the at least one thermoplastic polyolefin elastomer TPO and from the at least one thermoplastic vulcanizate TPV.

According to one or more embodiments, the at least one propylene copolymer PCP comprises 1-65 wt.-%, preferably 5-60 wt.-%, preferably 10-55 wt.-%, more preferably 15-50 wt.-%, even more preferably 20-45 wt.-%, even more preferably 25-40 wt.-%, of the total weight of the thermoplastic composition. According to one or more further embodiments, the at least one propylene copolymer PCP comprises 2.5-45 wt.-%, preferably 5-40 wt.-%, more preferably 10-35 wt.-%, even more preferably 15-35 wt.-%, of the total weight of the thermoplastic composition.

Preferably, the at least one propylene copolymer PCP is a random propylene-ethylene copolymer, preferably having a propylene content of at least 60 wt.-%, more preferably at least 70 wt.-%, based on the weight of the propylene copolymer PCP. According to one or more embodiments, the at least one propylene copolymer PCP has an ethylene content of 5-20 wt.-%, more preferably 9-18 wt.-%, even more preferably 12-18 wt.-%, still more preferably 12-16 wt.-%, based on the weight of the propylene copolymer.

According to one or more embodiments, the at least one propylene copolymer PCP has:
- a flexural modulus at 23° C. determined according to ISO 178:2019 standard of not more than 100 MPa, preferably not more than 75 MPa, more preferably not more than 65 MPa, even more preferably not more than 50 MPa and/or
- a xylene cold soluble content determined according to ISO 16152:2005 standard of at least 70 wt.-%, preferably at least 80 wt.-%, more preferably at least 90 wt.-%, even more preferably at least 95 wt.-%, still more preferably at least 99 wt.-% and/or
- a softening point determined by Ring and Ball measurement conducted according to DIN EN 1238 standard of not more than 95° C., preferably not more than 75° C., more preferably not more than 70° C., even more preferably not more than 65° C. and/or
- a melt flow rate (230° C./2.16 kg) determined according to ISO 1133 standard of not more than 50 g/10 min, preferably not more than 40 g/10 min, more preferably not more than 35 g/10 min, even more preferably not more than 30 g/10 min and/or
- a density at 23° C. determined according to ASTM D-792 standard of 0.850-0.900 g/cm$^3$, preferably 0.855-0.890 g/cm$^3$.

Particularly suitable propylene-ethylene copolymers for use as the at least one propylene copolymer PCP include the propylene-ethylene copolymers, which are commonly characterized as "propylene-based elastomers". These are commercially available, for example, under the trade name of Versify® (from Dow Chemicals) and under the trade name of Vistamaxx® (from Exxon Mobil).

The thermoplastic composition of the present invention may further contain other thermoplastic polymers. According to one or more embodiments, the thermoplastic composition further comprises at least one ethylene copolymer ECP having an ethylene content of at least 50 wt.-%, preferably at least 55 wt.-%, more preferably at least 65 wt.-%, based on the weight of the ethylene copolymer ECP.

The at least one ethylene copolymer ECP is preferably an ethylene-α-olefin copolymer. Suitable ethylene-α-olefin copolymers include ethylene-α-olefin random and block copolymers of ethylene and one or more $C_3$-$C_{20}$ α-olefin monomers, in particular one or more of propylene, 1-butene, 1-pentene, 1-hexene, 1-heptene, 1-octene, 1-decene, 1-dodecene, and 1-hexadodecene.

Particularly suitable ethylene-α-olefin copolymers include, for example, ethylene-based plastomers, which are commercially available, for example, under the trade name of Affinity®, such as Affinity® EG 8100G, Affinity® EG 8200G, Affinity® SL 8110G, Affinity® KC 8852G, Affinity® VP 8770G, and Affinity® PF 1140G (all from Dow Chemical Company); under the trade name of Exact®, such as Exact® 3024, Exact® 3027, Exact® 3128, Exact® 3131, Exact®4049, Exact®4053, Exact® 5371, and Exact® 8203 (all from Exxon Mobil); and under the trade name of Queo® (from *Borealis* AG).

Other suitable ethylene-α-olefin copolymers include, for example, ethylene-based polyolefin elastomers (POE), which are commercially available, for example, under the trade name of Engage®, such as Engage® 7256, Engage® 7467, Engage® 7447, Engage® 8003, Engage® 8100, Engage®8480, Engage® 8540, Engage® 8440, Engage® 8450, Engage® 8452, Engage® 8200, and Engage® 8414 (all from Dow Chemical Company).

Further suitable ethylene-α-olefin copolymers include ethylene-α-olefin block copolymers, such as ethylene-based olefin block copolymers (OBC), which are commercially available, for example, under the trade name of Infuse®, such as Infuse® 9100, Infuse®9107, Infuse®9500, Infuse® 9507, and Infuse® 9530 (all from Dow Chemical Company).

According to one or more embodiments, the at least one ethylene copolymer ECP is an ethylene-butene copolymer or an ethylene-octene copolymer, preferably an ethylene-butene random copolymer or an ethylene-octene random copolymer, preferably having a comonomer (butene or octene) content of 5-50 wt.-%, more preferably 10-45 wt.-%, even more preferably 15-40 wt.-%, based on the weight of the ethylene copolymer.

According to one or more embodiments, the at least one ethylene copolymer ECP is an ethylene-octene copolymer, preferably an ethylene-octene random copolymer, preferably having an octene content of 5-45 wt.-%, more preferably 10-40 wt.-%, even more preferably 15-35 wt.-%, still more preferably 15-30 wt.-%, such as 15-25 wt.-%, based on the weight of the ethylene-octene copolymer.

The proportion of butene or octene in an ethylene-butene copolymer or in an ethylene-octene copolymer can be determined directly by 1H-NMR spectroscopy method known to a person skilled in the art.

According to one or more embodiments, the octene content of the ethylene-octene copolymer is determined using the method as described below.

Method for Determining Octene Content of Ethyne-Octene Copolymers

1H-NMR spectroscopy is carried out with a Bruker Ultrashield 300 MHz. A sample of 30-35 mg the copolymer is dissolved in 0.7 mL of 1,2-dichlorobenzene-d4 for 2 hours at 150° C. and 256 scans are accumulated at 130° C. For the calculation of the 1-octene content, the following formula is used:

$$\frac{I_{CH_3}}{I_{CH_2} \cdot \left(1 - \frac{1}{3}x\right) + \frac{I_{CH_3}}{3}} = \frac{1}{3}x$$

where $I_{CH_3}$ corresponds to the integral of the peak at 0.9 ppm assigned to the methyl terminal group, $I_{CH_2}$ corresponds to the integral of the peak at 1.3 ppm which is assigned to the H atoms of the CH2 groups of the base structure and of the 1-octene side chains, and x corresponds to the content of octene in mol.-%. The content of octene in wt.-% can be calculated from the content of octene in mol.-% by using the following formula:

$$\frac{\text{mol }\%_{octene} \cdot M_{W_{octene}}}{\text{mol }\%_{ethylene} \cdot M_{W_{ethylene}} + \text{mol }\%_{octene} \cdot M_{W_{octene}}} \cdot 100\%$$

The measured peak positions correspond to the data presented in the literature.

According to one or more embodiments, the least one ethylene copolymer ECP has a flexural modulus at 23° C. determined according to ISO 178:2019 standard of not more than 150 MPa, preferably not more than 125 MPa, more preferably not more than 100 MPa, even more preferably not more than 85 MPa and/or a melt flow rate (190° C./2.16 kg) determined according to ISO 1133 standard of not more than 50 g/10 min, preferably not more than 35 g/10 min, more preferably not more than 25 g/10 min, even more preferably not more than 15 g/10 min and/or a density at 23° C. determined according to ASTM D-792 standard of 0.850-0.915 g/cm$^3$, preferably 0.855-0.900 g/cm$^3$.

Particularly suitable ethylene-octene copolymers for use as the at least one ethylene copolymer ECP include the ethylene-octene copolymers, which are commercially available, for example, under the trade name of Engage® (from Dow Chemicals), under the trade name of Exact® (from Exxon Mobil), and under the trade name of Queo® (from *Borealis* AG).

According to one or more embodiments, the at least one ethylene copolymer ECP comprises 5-45 wt.-%, preferably 10-40 wt.-%, more preferably 10-35 wt.-%, even more preferably 15-35 wt.-%, still more preferably 20-30 wt.-% of the total weight of the thermoplastic composition.

According to one or more embodiments, the sum of the amounts of the at least one thermoplastic vulcanizate TPV, the at least one thermoplastic polyolefin elastomer TPO, and the at least one propylene copolymer PCP comprises at least 35 wt.-%, preferably at least 50 wt.-%, more preferably at least 55 wt.-%, even more preferably at least 60 wt.-%, still more preferably at least 65 wt.-%, of the total weight of the thermoplastic composition.

The thermoplastic composition may further comprise various additives, such as fillers, UV- and heat stabilizers, antioxidants, plasticizers, flame retardants, dyes, pigments, matting agents, antistatic agents, impact modifiers, biocides, and processing aids such as lubricants, slip agents, antiblock agents, and denest aids. The total amount of these types of additives is preferably not more than 60 wt.-%, more preferably not more than 50 wt.-%, even more preferably not more than 40 wt.-%, based on the total weight of the thermoplastic composition.

According to one or more embodiments, the thermoplastic composition further comprises at least one solid particulate filler F and/or at least one flame retardant FR.

Suitable fillers for use as the at least one solid particulate filler F include, for example, inert mineral fillers, such as sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more embodiments, the at least one solid particulate filler F is selected from the group consisting of calcium carbonate, magnesium carbonate, clay, expanded clay, diatomaceous earth, pumice, mica, kaolin, talc, dolomite, xonotlite, perlite, vermiculite, Wollastonite, barite, calcium hydroxide, calcium aluminates, silica, fumed silica, and fused silica.

The at least one solid particulate filler F is preferably present in the thermoplastic composition in the form of finely divided particles. The term "finely divided particles" refers here to particles, whose median particle size d$_{50}$ does not exceed 250 μm, preferably 150 μm, more preferably 50 μm. The term "median particle size d$_{50}$" refers in the present disclosure to a particle size below which 50% of all particles by volume are smaller than the d$_{50}$ value. The particle size distribution can be determined by sieve analysis according to the method as described in ASTM C136/C136M-2014 standard ("Standard Test Method for Sieve Analysis of Fine and Coarse Aggregates).

According to one or more embodiments, the at least one solid particulate filler F has a median particle size d$_{50}$ in the range of 0.1-100 μm, preferably 0.15-50 μm, more preferably 0.25-25 μm, even more preferably 0.35-15 μm, still more preferably 0.5-10 μm.

According to one or more embodiments, the at least one solid particulate filler F comprises 0.5-35 wt.-%, preferably 1-30 wt.-%, more preferably 5-30 wt.-%, even more preferably 10-25 wt.-%, still more preferably 12.5-25 wt.-%, of the total weight of the thermoplastic composition.

According to one or more embodiments, the thermoplastic composition further comprises at least one flame retardant FR.

The at least one flame retardant FR is preferably selected from the group consisting of magnesium hydroxide, aluminum trihydroxide, antimony trioxide, ammonium polyphosphate, and melamine-, melamine resin-, melamine derivative-, melamine-formaldehyde-, silane-, siloxane-, and polystyrene-coated ammonium polyphosphates.

Other suitable flame retardants for use as the at least one flame retardant FR include, for example, 1,3,5-trazine compounds, such as melamine, melam, melem, melon, ammeline, ammelide, 2-ureidomelamine, acetoguanamine, benzoguanamine, diaminophenyltriazine, melamine salts and adducts, melamine cyanurate, melamine borate, melamine orthophosphate, melamine pyrophosphate, dimelamine pyrophosphate and melamine polyphosphate, oligomeric and polymeric 1,3,5-triazine compounds and polyphosphates of 1,3,5-trazine compounds, guanine, piperazine phosphate, piperazine polyphosphate, ethylene diamine phosphate, pentaerythritol, borophosphate, 1,3,5-trihydroxyethylisocyanaurate, 1,3,5-tiglycidylisocyanaurate, triallylisocyanurate and derivatives of the aforementioned compounds.

Suitable flame retardants are commercially available, for example, under the trade names of Martinal® and Magnifin® (both from Albemarle) and under the trade names of Exolit® (from Clariant), Phos-Check® (from Phos-Check) and FR CROS® (from Budenheim).

According to one or more embodiments, the at least one flame retardant FR comprises 1-50 wt.-%, preferably 5-45 wt.-%, more preferably 10-40 wt.-%, even more preferably 10-35 wt.-%, of the total weight of the thermoplastic composition.

The thermoplastic composition may further comprise at least one UV-stabilizer, preferably at least one hindered amine light stabilizer (HALS). These types of compounds are typically added to polymer blends to prevent light-induced polymer degradation. Such UV-stabilizers are needed especially in case shaped articles obtained by using the thermoplastic composition are used in outdoor applications, for example, for waterproofing of roof structures and for waterproofing of construction gaps in building facades, for example gaps between a building structure and window or curtain wall components.

According to one or more embodiments, the thermoplastic composition comprises 0.05-10 wt.-%, preferably 0.1-5 wt.-%, more preferably 0.25-2.5 wt.-%, even more preferably 0.25-1.5 wt.-%, based on the total weight of the thermoplastic composition, of at least one hindered amine light stabilizer (HALS).

The thermoplastic composition may further comprise at least one UV-absorber, preferably selected the group consisting of hydroxybenzophenones, hydroxybenzotriazoles, triazines, anilides, benzoates, cyanoacrylates, phenylformamidines, and mixtures thereof. According to one or more embodiments, the thermoplastic composition comprises 0.05-10 wt.-%, preferably 0.1-5 wt.-%, more preferably 0.25-2.5 wt.-%, even more preferably 0.25-1.5 wt.-%, based on the total weight of the thermoplastic composition, of at least one UV-absorber, preferably selected from the group consisting of hydroxybenzophenones, hydroxybenzotriazoles, triazines, anilides, benzoates, cyanoacrylates, phenylformamidines.

Suitable UV-absorbers are commercially available, for example, under the trade name of Tinuvin® (from Ciba Specialty Chemicals), such as Tinuvin®213, 234, 320, 326-329, 350, 360, 571.

The preferences given above for the at least one thermoplastic vulcanizate TPV, the at least one thermoplastic polyolefin elastomer TPO, the at least one propylene copolymer PCP, the at least one ethylene copolymer ECP, the at least one solid particulate filler F, and the at least one flame retardant FR apply equally apply equally to all subjects of the present invention unless otherwise stated.

Another subject of the present invention is a sealing device comprising a waterproofing layer obtained by using the thermoplastic composition of the present invention. Preferably, the waterproofing layer comprises or is composed of the thermoplastic composition of the present invention.

The term "layer" refers in the present disclosure generally to a sheet-like element having first and second major surfaces, i.e. top and bottom surfaces, a width defined between longitudinally extending edges, and a thickness defined between the first and second major surfaces. Preferably, a sheet-like element has a length and width of at least 15 times, preferably at least 25 times, more preferably at least 50 times greater than the thickness of the element.

Preferably, the waterproofing layer has a thickness of not more than 10 mm, preferably not more than 5 mm, more preferably not more than 3.5 mm, even more preferably not more than 3.0 mm, still more preferably not more than 2.5 mm. According to one or more embodiments, the waterproofing layer has a thickness of 0.05-5 mm, preferably 0.1-3.5 mm, more preferably 0.25-3 mm, even more preferably 0.3-2.5 mm, still more preferably 0.35-2 mm. The thickness of layer can be determined by using the measurement method as defined in DIN EN 1849-2:2010-04 standard There are no strict limitations for the width and length of the waterproofing layer, and these depend on the intended use of the sealing device. For example, the sealing device can be provided in form of a narrow strip, wherein the waterproofing layer has a width, for example, in the range of 25-500 mm, such as 50-400 mm, particularly 75-350 mm. The term "width" and "length" refer to the two perpendicular dimensions measured in the horizontal plane of the first and second major surfaces of a sheet-like element. Generally, the "width" of a sheet like element is the smaller of the horizontal dimensions of a sheet-like element. Consequently, the "width" of the waterproofing layer refers to the minor dimension measured in the horizontal plane of the waterproofing layer in a direction perpendicular to the length of the waterproofing layer. The sealing device can also be provided in form of a broad sheet, wherein the waterproofing layer has a width of, for example, in the range of 0.75-5 m, such as 0.85-3.5 m, particularly 1-2.5 m. The sealing device of the present invention is typically delivered to a construction site in form of a roll, transferred to the place of installation, and adhered to the substrate to be waterproofed.

Preferably, the waterproofing layer has a width of 25-5000 mm, preferably 35-3500 mm, more preferably 55-2500 mm, even more preferably 75-2000 mm, still more preferably 100-1750 mm. According to one or more embodiments, the waterproofing layer has a width in the range of 25-750 mm, preferably 50-500 mm, more preferably 75-500 mm, even more preferably 100-500 mm, still more preferably 100-350 mm. According to one or more embodiments, the waterproofing layer has a width in the range of 0.5-5 m, preferably 0.75-3.5 m, more preferably 0.85-2.5 m, even more preferably 1-2 m.

One of the advantages of the thermoplastic composition of the present invention is that shaped articles obtained by using the composition show low blocking behavior, which enables unproblematic post-processing, such as cutting, stacking, and unwinding from a roll of the shaped articles.

Preferably, the waterproofing layer of the sealing device exhibits a blocking value, determined by means of the method cited in the description, of not more than 50 N/15 mm, preferably not more than 40 N/15 mm, most preferably not more than 30 N/15 mm. In the context of the present invention, the term "blocking value" refers to the peeling force, which is required to separate two layers composed of the same material from each other, and which is determined by using the measurement method as described below.

Measurement of the Blocking Value

The blocking value of a layer is determined based on the measurement method as defined in DIN 53366 standard. The measurement is conducted at a temperature of 23° C. using a shearing mode instead of a peeling mode, i.e. the layers are separated from each other by using a shearing force. The blocking value is determined as force in N/15 mm width of layer required to separate the two layers from each other after the layers have been pressed together for a period of 48 hours at a temperature of 50° C. using a pressure of 15 kg/m$^2$.

Another advantage of the thermoplastic composition of the present invention is that shaped articles obtained by using the thermoplastic composition exhibit a high flexibility, especially compared to State-of-the-Art TPO-materials.

According to one or more embodiments, the waterproofing layer of the sealing device has a storage modulus measured at a temperature of 0° C. by dynamical mechanical analysis (DMA) of not more than 75 MPa, preferably not more than 50 MPa, more preferably not more than 45 MPa, even more preferably not more than 40 MPa. The storage modulus is preferably determined by dynamical mechanical analysis (DMA) using a method based on ISO 6721-10:2015 standard and A deformation amplitude (gamma) of 0.1 to 1%
Linear frequency of 1 Hz
Normal force of −0.2 N
Temperature of −50 to +30° C. and
Rate of temperature change of 2° C. per minute.

The waterproofing layer of the sealing device is preferably obtained by a process comprising melt-processing a composition comprising or consisting of the constituents of the thermoplastic composition of the present invention. The term "melt-processing" refers in the present disclosure to a process, in which at least one molten polymeric component is intimately mixed with at least one other component, which may be another molten polymeric component or a solid component, such as a filler, until a melt blend, i.e. a substantially homogeneously mixed mixture of the polymeric component(s) and the other constituents is obtained.

The melt processing of the composition can be conducted as a batch process using any conventional mixer, such as a Brabender, Banbury, or roll mixer or as continuous process using a continuous type mixer, preferably an extruder, such as a single screw or a twin-screw extruder or a planetary roller extruder.

The process by which the waterproofing layer is obtained preferably comprises a further step of melt-shaping of the melt-processed composition into a form of a shaped article. The melt-shaping step can be conducted by using various techniques known to those of skill in the art, such as, extruding, co-extruding, molding, thermoforming, film blowing, casting, or calendaring.

The sealing device may further comprise one or more reinforcing layers. A reinforcing layer may be fully embedded into the waterproofing layer or directly or indirectly adhered to one of the major surfaces of the waterproofing layer. The expression "fully embedded" is understood to mean that the reinforcing layer is fully covered by the matrix of the waterproofing layer. The expression "directly adhered" is understood to mean that no further layer or substance is present between the layers and that the opposing surfaces of the layers are directly adhered to each other. At the transition area between the two layers, the materials of the layers can also be present mixed with each other. The reinforcing layer and the waterproofing layer can be indirectly adhered to each other, for example, via a connecting layer, such as a layer of adhesive.

The type of the reinforcing layer, if used, is not particularly restricted. For example, the reinforcing layers commonly used for improving the dimensional stability of roofing membranes can be used. Preferable reinforcing layers include non-woven fabrics, woven fabrics, and laid scrims, and combinations thereof.

The term "non-woven fabric" designates in the present disclosure materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a non-woven fabric.

The term "laid scrim" refers in the present disclosure to web-like non-woven products composed of at least two sets of parallel yarns (also designated as weft and warp yarns), which lay on top of each other and are chemically bonded to each other. The yarns of a non-woven scrim are typically arranged with an angle of 60-120°, such as 90±5°, towards each other thereby forming interstices, wherein the interstices occupy more than 60% of the entire surface area of the laid scrim. Typical materials for laid scrims include metal fibers, inorganic fibers, in particular glass fibers, and synthetic organic fibers, in particular polyester, polypropylene, polyethylene, and polyethylene terephthalate (PET).

According to one or more embodiments, the sealing device comprises a reinforcing layer composed of synthetic organic fibers, preferably selected from the group consisting of polyester fibers, polypropylene fibers, polyethylene fibers, nylon fibers, and polyamide fibers and/or a reinforcing layer composed of inorganic fibers, preferably selected from the group consisting of glass fibers, aramid fibers, wollastonite fibers, and carbon fibers, more preferably glass fibers.

According to one or more embodiments, the reinforcing layer has been thermally laminated to one of the major surfaces of the waterproofing layer in a manner that gives direct bonding between the reinforcing layer and the waterproofing layer. The term "thermal lamination" refers to a process, in which the layers are bonded to each by the application of thermal energy. In particular, the term "thermal lamination" refers to a process comprising partially melting at least one of the layers upon application of thermal energy followed by a cooling step, which results in formation of a physical bond between the layers without using an adhesive.

According to one or more embodiments, the sealing device further comprises a second waterproofing layer, preferably obtained by using the thermoplastic composition of the present invention. Preferably, the waterproofing layer comprises or is composed of the thermoplastic composition of the present invention.

Preferably, the second waterproofing layer has a thickness of not more than 10 mm, preferably not more than 5 mm, more preferably not more than 3.5 mm, even more preferably not more than 2.5 mm, still more preferably not more than 2 mm. According to one or more embodiments, the waterproofing layer has a thickness of 0.05-5 mm, preferably 0.1-3.5 mm, more preferably 0.25-3 mm, even more preferably 0.3-2.5 mm, still more preferably 0.35-2 mm.

According to one or more embodiments, the sealing device comprises a first and a second waterproofing layer obtained by using the thermoplastic composition of the present invention and a first and a second reinforcing layer, wherein the first reinforcing layer is preferably composed of synthetic organic fibers, preferably selected from the group consisting of polyester fibers, polypropylene fibers, polyethylene fibers, nylon fibers, and polyamide fibers and wherein the second reinforcing layer is preferably composed of inorganic fibers, preferably selected from the group consisting of glass fibers, aramid fibers, wollastonite fibers, and carbon fibers, more preferably glass fibers.

The first and second reinforcing layers are preferably located between the waterproofing layer and the second waterproofing layer.

Another subject of the present invention is a method for producing a sealing device according to the present invention, the method comprising melt-processing a composition comprising the constituents of the thermoplastic composition and melt-shaping of the melt-processed composition into a form of a shaped article.

The melt processing of the composition can be conducted as a batch process using any conventional mixer, such as a Brabender, Banbury, or roll mixer or as continuous process using a continuous type mixer, preferably an extruder, such as a single screw or a twin-screw extruder or a planetary roller extruder.

The melt-shaping step can be conducted by using various techniques known to those of skill in the art, such as, extruding, co-extruding, molding, thermoforming, film blowing, casting, or calendaring.

According to one or more embodiments, the method for producing a sealing device comprises steps of:
  i) Melt-processing a composition comprising the constituents of the thermoplastic composition in an extruder to provide a melt-blend and
  ii) Extruding said melt-blend through an extruder die.

Any conventional extruder may be used for conducting step i) of the method, such as, a ram extruder, single screw extruder, a twin-screw extruder, or a planetary roller extruder. Preferably, the extruder is a screw extruder, more preferably a twin-screw extruder comprising a barrel and a screw unit contained in the barrel. The screw unit of a conventional screw extruder is typically considered to comprise feed, transition, and metering sections. In the feed section the thermoplastic composition enters the channels of the rotating screw and is conveyed towards the transition section, in which the composition is compressed and melted. The composition should be fully melted when it leaves the transition section. The function of the metering section is to homogenize the melted composition and to allow it to be metered or pumped out at constant rate. The extruder die used for conducting step ii) of the method is preferably a flat die, consisting of manifold, approach, and lip regions.

The extruder barrel comprises a feed port through which the material to be extruded is fed to the extruder and an outlet port through which the material leaves the barrel. The outlet port is coupled with the die via a gate or adapter piece. A mixing device may be interposed between the barrel and the die. The feed port is generally connected with a hopper to which the material to be extruded is added. It is preferred that a screen pack and a breaker plate are positioned at the end of the barrel to avoid plugging in the nozzles. The extruder further comprises heating elements, cooling elements, temperature sensors and temperature control elements to provide temperature-controlled zones along the barrel, also known as barrel zones. The extruder may comprise, for example, from 3 to 8 barrel zones, preferably at least 5 barrel zones, by the use of which a temperature profile can be realized in the barrel.

The extrusion process may be conducted by using different temperature profiles, such as an increasing temperature profile where the temperature increases downstream the barrel, a decreasing temperature profile where the temperature decreases downstream the barrel, or a humped temperature profile where the temperature increases from the feed port toward a certain set point, for example toward the middle of the barrel.

The maximum temperature of the composition during melt processing in the screw section of the extruder, i.e. the temperature in at the end of the screw section, is preferably not less than 150° C., more preferably not less than 160° C., most preferably not less than 180° C. The maximum temperature of the composition during melt processing in the screw section of the extruder can be in the range of 150-250° C., for example 160-220° C., such as 180-200° C.

The constituents of the thermoplastic composition may be fed to the extruder as individual streams, as a pre-mix, dry blend, or as a master batch.

The at least one thermoplastic vulcanizate TPV, the at least one thermoplastic polyolefin elastomer TPO, and the at least one propylene copolymer PCP may be fed into the extruder through the feed port and at least a portion of the additives, such as fillers, flame retardants, UV-stabilizers and UV-absorbers, if used, may fed into the extruder through another port located downstream from the feed port. The term "downstream" designates in the present document the direction to the outlet port. Alternatively, at least a portion of the additives can be mixed with the polymer components to obtain a premix, which is then fed into the extruder through the feed port. The premixing can be carried out using a blending apparatus, which are known to a person skilled in the art. Furthermore, the polymer components can be processed in a compounding extruder to pellets or granules, which are dry-blended with at least a portion of the additives and the resulting dry-blend is then fed into extruder though the feed port.

Another subject of the present invention is a method for waterproofing a substrate, the method comprising steps of:
  I) Applying two or more sealing devices of the present invention on the surface of the substrate to be waterproofed,
  II) Overlapping adjoining sealing devices along the length and/or width of the sealing devices,
  III) Heating the overlapped portions of the sealing devices above the melting temperature of the waterproofing layer and bonding the opposing surfaces of the overlapped portions to each other under sufficient pressure to provide acceptable seam strength without use of adhesive.

According to one or more embodiments, the substrate to be waterproofed is a roofing substrate, preferably selected from the group consisting of an insulation board, a cover board, and an existing roofing membrane.

According to one or more embodiments, the adjoining sealing devices are overlapped along the length and width of the sealing devices. According to one or more further embodiments, the adjoining sealing devices are overlapped at least 25 mm, preferably at least 50 mm, more preferably at least 75 mm, even more preferably at least 100 mm, along the length and width of the sealing devices.

Step III) of the method for waterproofing a substrate can be conducted manually, for example by using a hot air tool, or by using an automatic welding device, such as an automatic hot-air welding device, for example Sarnamatic®661 welding device. The temperature to which the overlapped portions of the adjoining sealing devices are heated depends on the embodiment of the sealing devices and also whether the welding step is conducted manually or by using an automatic welding device. Preferably, the overlapped portions of the adjoining sealing devices are heated to a temperature of at or above 150° C., more preferably of at or above 200° C.

EXAMPLES

The materials shown in Table 1 were used for preparing the membrane sheets.

TABLE 1

| Material | Type/description | Provider |
|---|---|---|
| Vistamaxx 6102 | Propylene-ethylene copolymer, ethylene content 16 wt.-%, MFR (230° C./2.16 kg) 3 g/10 min (ASTM D1238) | Exxon Mobil |
| Vistamaxx 6202 | Propylene-ethylene copolymer, ethylene content 15 wt.-%, MFR (230° C./2.16 kg) 20 g/10 min (ASTM D1238) | Exxon Mobil |
| Borsoft SD233CF | Reactor TPO (heterophasic propylene copolymer), MFR (230° C./2.16 kg) 7 g/10 min (ASTM D1238), flexural modulus at 23° C. (ISO 178) 400 MPa | Borealis |
| Hifax CA 10 A | Reactor TPO (heterophasic propylene copolymer), MFR (230° C./2.16 kg) 0.6 g/10 min (ASTM D1238), flexural modulus at 23° C. (ISO 178) 80 MPa | Lyondell Basell |
| Hifax CA 212 A | Reactor TPO (heterophasic propylene copolymer), MFR (230° C./2.16 kg) 8 g/10 min (ASTM D1238), flexural modulus at 23° C. (ISO 178) 80 MPa | Lyondell Basell |
| Milastomer 6032 NE | Olefin-based thermoplastic vulcanizate (TPV) | Mitsui Chemicals |
| BB2030 | Bromobutyl rubber | Lanxess |
| Silox Actif E80 | Zinc oxide catalyst | Safic Alcan |
| Additive package | Composed of thermal stabilizer and UV-stabilizer | |
| Titanium dioxide | TiO2 | Kronos |
| ATH | Al(OH)3 | Albemarle |

The inventive and reference membrane sheets were prepared according to the procedure as described below and tested for their mechanical properties.

Preparation of Membrane Sheets

The membrane sheets for the single and double-layer membranes were produced using a laboratory scale extrusion-calendering apparatus consisting of a twin-screw extruder (Berstorff GmbH), a flat die and set of water-cooled calender rolls.

In case of the inventive membrane Ex-1 and the reference membrane Ref-1, the constituents of the thermoplastic composition were fed to the extruder hopper. The blend was melt-processed in the extruder and extruded through a flat die into single ply sheets having a thickness of approximately 0.6 mm. The extrusion was conducted using an extrusion temperature of ca. 180° C.

In case of the inventive membranes Ex-2 to Ex-6 and the reference membrane Ref-2, the thermoplastic polymers and the elastomer of the thermoplastic composition were fed to the extruder hopper. The polymer blend was melt-processed in the first of the four zones of the extruder and the additive package as well as flame retardant and catalyst, if used, were added to the partially melt-processed blend at beginning of the second zone of the extruder. The melt-processed blend was then extruded through an extruder flat die into single ply sheets having a thickness of approximately 0.8 mm. The extrusion was conducted using an extrusion temperature of ca. 165° C. and pressure of ca. 120 bars.

The inventive membranes Ex-1, Ex-2, Ex-4 to Ex-6 and the reference membrane Ref-1 were single-layer membranes composed if a layer of the thermoplastic composition whereas the inventive membrane Ex-3 and the reference membrane Ref-2 were double-layer membranes comprising top and bottom layers composed of the same thermoplastic composition and a glass fleece (non-woven) placed between the top and bottom layers.

The constituents of the thermoplastic compositions and their amounts fed into the extruder during the preparation of the membrane sheets are shown in Tables 2 and 3.

Flexibility

Flexibility of the membranes was determined by measuring the storage modulus (G') of the tested membrane at temperatures of −30° C., 0° C., and +30° C. The storage moduli were measured by dynamical mechanical analysis (DMA) using a method based on ISO 6721-10:2015 standard and A deformation amplitude (gamma) of 0.1 to 1%

Linear frequency of 1 Hz

Normal force of −0.2 N

Temperature of −50 to +30° C. and

Rate of temperature change of 2° C. per minute

The values of the storage moduli (G') presented in Tables 2 and 3 have been obtained with test specimen, which were cut from the tested membranes in a lengthwise direction.

Tensile Stress and Elongation at Break

The tensile stress and elongation at break were measured for samples cut from the tested membranes in machine and cross machine direction. The measurements were conducted according to EN 12311-2:2013 standard at a temperature of 23° C. using a cross head speed of 500 mm/min and at 70° C. using a cross head speed of 100 mm/min. The values for tensile stress and elongation at break obtained with the tested membranes are presented in Tables 2 and 3.

Resistance to Impact

The resistance to impact was measured by using the method as defined in EN 12691 type A standard and in EN 12691 type B standard.

TABLE 2

| Composition [wt.-%] | Ref-1 | Ex-1 | Ex-2 | Ex-3 | Ref-2 |
|---|---|---|---|---|---|
| Vistamaxx 6102 | 0.00 | 47.50 | 31.70 | 0.00 | 0.00 |
| Vistamaxx 6202 | 0.00 | 0.00 | 0.00 | 31.85 | 30.83 |
| Borsoft SD233CF | 0.00 | 37.50 | 25.00 | 0.00 | 0.00 |

TABLE 2-continued

| Composition [wt.-%] | Ref-1 | Ex-1 | Ex-2 | Ex-3 | Ref-2 |
|---|---|---|---|---|---|
| Hifax CA 10 A | 0.00 | 0.00 | 0.00 | 6.50 | 13.28 |
| Hifax CA 212 A | 0.00 | 0.00 | 0.00 | 5.85 | 6.29 |
| Milastomer 6032 NE | 100.00 | 15.00 | 10.00 | 20.81 | 0.00 |
| Butyl rubber | 0.00 | 0.00 | 0.00 | 0.00 | 13.97 |
| Silox Actif | 0.00 | 0.00 | 0.00 | 0.00 | 0.73 |
| Additive package | 0.00 | 0.00 | 0.00 | 1.18 | 0.94 |
| TiO2 | 0.00 | 0.00 | 0.00 | 3.90 | 3.77 |
| ATH | 0.00 | 0.00 | 33.30 | 29.91 | 30.19 |
| Total | 100.00 | 100.00 | 100.00 | 100.00 | 100.00 |
| Storage modulus G' | | | | | |
| @ −30° C. [MPa] | — | 235 | 295 | 109 | 121 |
| @ 0° C. [MPa] | — | 46 | 215 | 37.8 | 20.8 |
| @ 30° C. [MPa] | — | 26 | 130 | 16.9 | 15.9 |
| Tensile strength @RT [N/mm²] MD | 4.72 | 10.2 | 12.2 | 6.9 | 7.6 |
| CD | — | — | — | 6.4 | 5.8 |
| Tensile strength @70° C. [N/mm²] MD | — | — | 3.1 | 2.1 | 2 |
| CD | — | — | — | 1.3 | 1.4 |
| Elongation at break @RT [%] MD | 441 | 816 | 805 | 679 | 761 |
| CD | — | — | — | 860 | 900 |
| Elongation at break @70° C. [%] MD | — | — | 780 | 654 | 750 |
| CD | — | — | — | — | — |
| Resistance to impact A [mm] | 200 | — | 1250 | 800 | 800 |
| Resistance to impact B [mm] | 2300 | — | 1500 | 1500 | 1750 |

MD = machine direction,
CD = cross machine direction

TABLE 3

| Composition [wt.-%] | Ex-4 | Ex-5 | Ex-6 |
|---|---|---|---|
| Vistamaxx 6102 | 10.00 | 20.00 | 45.00 |
| Vistamaxx 6202 | 0.00 | 0.00 | 0.00 |
| Borsoft SD233CF | 46.67 | 36.67 | 11.67 |
| Hifax CA 10 A | 0.00 | 0.00 | 0.00 |
| Hifax CA 212 A | 0.00 | 0.00 | 0.00 |
| Milastomer 6032 NE | 10.00 | 10.00 | 10.00 |
| Butyl rubber | 0.00 | 0.00 | 0.00 |
| Silox Actif | 0.00 | 0.00 | 0.00 |
| Additive package | 0.00 | 0.00 | 0.00 |
| TiO2 | 0.00 | 0.00 | 0.00 |
| ATH | 33.33 | 33.33 | 33.33 |
| Total | 100.00 | 100.00 | 100.00 |
| Storage modulus G' | | | |
| @ −30° C. [MPa] | 938 | 634 | 87 |
| @ 0° C. [MPa] | 344 | 209 | 20 |
| @ 30° C. [MPa] | 159 | 96 | 11 |
| Tensile strength @RT [N/mm²] MD | 11.2 | 11.6 | 13.9 |
| CD | — | — | — |
| Tensile strength @70° C. [N/mm²] MD | 5.5 | 3.8 | 0.7 |
| CD | — | — | — |
| Elongation at break @RT [%] MD | 564 | 683 | 962 |
| CD | — | — | — |
| Elongation at break @70° C. [%] MD | 780 | 770 | 793 |
| CD | — | — | — |
| Resistance to impact A [mm] | — | — | — |
| Resistance to impact B [mm] | — | — | — |

MD = machine direction, CD = cross machine direction

The invention claimed is:

1. A thermoplastic composition comprising:
a) at least one thermoplastic vulcanizate TPV,
b) at least one thermoplastic polyolefin elastomer TPO, and
c) at least one propylene copolymer PCP, wherein
the at least one thermoplastic polyolefin elastomer TPO has a flexural modulus at 23° C. determined according to ISO 178:2019 standard of not more than 750 MPa,
the at least one propylene copolymer PCP is a propylene-ethylene copolymer having a flexural modulus at 23° C. determined according to ISO 178:2019 standard of not more than 100 MPa, and
the at least one propylene copolymer PCP has a xylene cold soluble content determined according to ISO 16152:2005 standard of at least 70 wt.-%.

2. The thermoplastic composition according to claim 1, wherein the at least one thermoplastic vulcanizate TPV comprises 1-50 wt.-% of the total weight of the thermoplastic composition.

3. The thermoplastic composition according to claim 1, wherein the at least one thermoplastic vulcanizate TPV comprises a blend of a thermoplastic resin and particles of a at least partially vulcanized rubber dispersed throughout a matrix of the thermoplastic resin.

4. The thermoplastic composition according to claim 3, wherein the blend comprises 15-75 parts by weight of the thermoplastic resin and 25-85 parts by weight of the at least partially vulcanized rubber per 100 parts total weight of the thermoplastic resin and the at least partially vulcanized rubber.

5. The thermoplastic composition according to claim 3, wherein the blend further comprises 10-300 parts by weight of an additive oil per 100 parts by weight of the at least partially vulcanized rubber.

6. The thermoplastic composition according to claim 3, wherein the at least partially vulcanized rubber has a cross-linking degree determined by using a method as defined in ISO 10147:2011 standard of at least 50 wt.-%.

7. The thermoplastic composition according to claim 1, wherein the at least one thermoplastic polyolefin elastomer TPO comprises 1-30 wt.-% of the total weight of the thermoplastic composition.

8. The thermoplastic composition according to claim 1, wherein the at least one thermoplastic polyolefin elastomer TPO has a flexural modulus at 23° C. determined according to ISO 178:2019 standard of not more than 450 MPa.

9. The thermoplastic composition according to claim 1, wherein the at least one thermoplastic polyolefin elastomer TPO is a heterophasic propylene copolymer.

10. The thermoplastic composition according to claim 1, wherein the at least one propylene copolymer PCP comprises 5-65 wt.-% of the total weight of the thermoplastic composition.

11. The thermoplastic composition according to claim 1, wherein the at least one propylene copolymer PCP has an ethylene content of 5-20 wt.-% based on the weight of the propylene copolymer.

12. A sealing device comprising a waterproofing layer obtained by using the thermoplastic composition according to claim 1.

13. The sealing device according to claim 12, wherein the waterproofing layer has a thickness of 0.1-3.5 mm.

14. A method for producing a sealing device according to claim 12, the method comprising melt-processing a composition comprising the constituents of the thermoplastic composition and melt-shaping the melt-processed composition into a form of a shaped article.

15. A method for waterproofing a substrate comprising steps of:
   I) applying two or more sealing devices according to claim 12 on the surface of the substrate to be waterproofed,
   II) overlapping adjoining sealing devices along the length and/or width of the sealing devices,
   III) heating the overlapped portions of the sealing devices above the melting temperature of the waterproofing layer and bonding the opposing surfaces of the overlapped portions to each other under sufficient pressure to provide acceptable seam strength without use of adhesive.

16. The thermoplastic composition according to claim 1, wherein the at least one thermoplastic polyolefin elastomer TPO has a melting temperature determined by DSC according to ISO 11357-3:2018 standard using a heating rate of 2° C./min of at least 100° C.

17. The thermoplastic composition according to claim 1, wherein the at least one propylene copolymer PCP has a flexural modulus at 23° C. determined according to ISO 178:2019 standard of not more than 100 MPa and/or a xylene cold soluble content determined according to ISO 16152:2005 standard of at least 70 wt.-% and/or a softening point determined by Ring and Ball measurement conducted according to DIN EN 1238 standard of not more than 95° C.

* * * * *